United States Patent
Keshavan et al.

(10) Patent No.: US 11,348,607 B1
(45) Date of Patent: May 31, 2022

(54) MANAGEMENT OF ACTUATOR DYNAMICS IN A MULTIPLE ACTUATOR HARD DISK DRIVE WITH AN UNEQUAL NUMBER OF HEADS ON THE TWO OUTER ARMS OF EACH ACTUATOR

(71) Applicant: Western Digital Technologies, Inc., San Jose, CA (US)

(72) Inventors: Manoj Keshavan, San Jose, CA (US); Siddhesh Vivek Sakhalkar, Berkeley, CA (US); Hitoshi Shindo, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/353,584

(22) Filed: Jun. 21, 2021

(51) Int. Cl.
*G11B 5/48* (2006.01)
*G11B 5/55* (2006.01)
*G11B 20/10* (2006.01)

(52) U.S. Cl.
CPC .............. *G11B 5/4826* (2013.01); *G11B 5/55* (2013.01); *G11B 20/10027* (2013.01)

(58) Field of Classification Search
CPC .................... G11B 5/4826; G11B 20/10027
See application file for complete search history.

(56) References Cited

U.S. PATENT DOCUMENTS

| | | | |
|---|---|---|---|
| 5,805,386 A | | 9/1998 | Faris |
| 6,115,215 A | * | 9/2000 | Adams ................... G11B 5/553 360/264.4 |
| 6,449,130 B1 | * | 9/2002 | Koyama .............. G11B 5/4813 360/264.4 |
| 6,519,109 B1 | * | 2/2003 | Price .................... G11B 5/5526 360/78.09 |
| 6,603,640 B1 | * | 8/2003 | Prater ..................... F16C 19/54 360/264.4 |

(Continued)

OTHER PUBLICATIONS

Sanders, James, Seagate preparing dual-actuator hard drive for data centers: Will it work?, TechRepublic, Storage, Mar. 5, 2019, 8 pages, TechRepublic, downloaded from https://www.techrepublic.com/article/seagate-preparing-dual-actuator-hard-drive-for-data-centers-will-it-work/.

(Continued)

*Primary Examiner* — Brian E Miller
(74) *Attorney, Agent, or Firm* — John D. Henkhaus (57) ABSTRACT

A hard disk drive includes multiple actuator assemblies, each of which includes a head-stack assembly (HSA) including an end-arm to which a single head-gimbal assembly (HGA) is coupled, where this end-arm is configured with a notch along one side and a triangular or quadrilateral-shaped through-hole at a root-side of the end-arm, and where the HSA further includes a plurality of other end- and inner-arms to each of which two HGAs are coupled and none of which have a through-hole near their root. The single-HGA end-arm may be further configured with an outer damper having a through-hole coincident with the end-arm through-hole, such that the through-hole of the end-arm is not covered by this damper, and an inner damper having no through-hole, such that the through-hole of the end-arm is covered by this damper. Gains are thereby better matched across all HGAs for problematic arm and system modes.

23 Claims, 9 Drawing Sheets

(56) References Cited

U.S. PATENT DOCUMENTS

| | | | | |
|---|---|---|---|---|
| 6,678,120 B2* | 1/2004 | Money | ............... | G11B 5/5521 |
| | | | | 360/264.2 |
| 7,161,769 B1 | 1/2007 | Chang et al. | | |
| 7,760,463 B2* | 7/2010 | Ward | ............... | G11B 21/025 |
| | | | | 360/78.12 |
| 9,361,919 B1 | 6/2016 | Lieu et al. | | |
| 10,192,575 B1* | 1/2019 | Resh | ............... | G11B 21/02 |
| 10,607,640 B2* | 3/2020 | Akatsuka | ............... | G11B 5/4813 |
| 10,699,730 B1* | 6/2020 | Uefune | ............... | G11B 5/012 |
| 10,861,488 B2* | 12/2020 | Hayasaka | ............... | G11B 5/4813 |
| 10,891,980 B1* | 1/2021 | Keshavan | ............... | G11B 5/5578 |
| 2002/0060885 A1* | 5/2002 | Money | ............... | G11B 5/5521 |
| | | | | 360/264.4 |
| 2002/0154449 A1* | 10/2002 | Raphael | ............... | G11B 33/08 |
| | | | | 360/266 |
| 2004/0016102 A1* | 1/2004 | Prater | ............... | F16C 35/06 |
| | | | | 29/469 |
| 2005/0157430 A1 | 7/2005 | Korkowski et al. | | |
| 2015/0287428 A1* | 10/2015 | Kerner | ............... | G11B 5/4833 |
| | | | | 360/244.2 |
| 2018/0226091 A1* | 8/2018 | Tan | ............... | G11B 5/4813 |
| 2019/0287557 A1* | 9/2019 | Akatsuka | ............... | G11B 5/4813 |
| 2019/0287558 A1* | 9/2019 | Hasegawa | ............... | G11B 5/5578 |
| 2019/0295578 A1* | 9/2019 | Kraus | ............... | G11B 5/4813 |
| 2020/0294538 A1* | 9/2020 | Uehara | ............... | G11B 25/043 |

OTHER PUBLICATIONS

Seagate, MACH.2 Multi-Actuator Hard Drives, Seagate India, 9 pages, downloaded from https://www.seagate.com/in/en/innovation/multi-actuator-hard-drives/# as early as Apr. 1, 2021.

* cited by examiner

Prior Art

FIG. 1

Prior Art

MANAGEMENT OF ACTUATOR DYNAMICS IN A MULTIPLE ACTUATOR HARD DISK DRIVE WITH AN UNEQUAL NUMBER OF HEADS ON THE TWO OUTER ARMS OF EACH ACTUATOR

FIELD OF EMBODIMENTS

Embodiments of the invention may relate generally to data storage devices such as hard disk drives and particularly to approaches for improving the structural dynamics of the actuators in a multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the need to develop and implement various means to increase high-capacity HDD performance.

In recent years the growth in areal density in HDDs has not kept pace with the trends of years past. This has shifted the burden on the mechanics to boost capacity increases by increasing the number of disks within the prescribed form factor. As these HDDs are primarily used for near line storage in data centers in hyper-scale environments, the performance of these high-capacity drives also has to satisfy the IOPs (Input/Output Operations Per Second) density requirements (in some instances, similarly referred to as IOPs/TB) to minimize latency. This demand has led to a shift to multiple actuators for providing parallel access to data.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to improving the structural dynamics of an actuator system in a multi-actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity HDDs has not scaled up commensurately with increases in storage capacity. This TOPS density deficit stands in the way of widespread adoption of such HDDs. In other words, the high latencies of large capacity HDDs in a clustered environment, such as in data centers with multiple clustered nodes, results in a bottleneck due to slower access to stored data. The pressure to increase the performance (e.g., TOPS) by reducing the latencies for data operations of high-capacity HDDs has become even stronger as capacities of HDDs continue to increase.

One possible approach to increasing HDD performance is the implementation of multi-actuator systems, in which multiple independently operating actuators are assembled onto a single shared pivot shaft in order to independently and concurrently read from and/or write to multiple recording disks of a disk stack. Since the available z-space (vertical height) within the drive is optimized to maximize the number of disks, the disk pitch would ideally be constant through the entire stack. However, due to additional space needed for the flex circuit and to allow the upper and lower actuators to rotate independently without interference, this becomes a challenging task. The endeavor to achieve constant disk pitch nevertheless continues.

For a dual-actuator drive, each actuator has two end-arms (or outer arms), i.e., a cover or base facing end-arm and another end-arm that faces the complementary actuator. If the number of disks in the disk stack is even, the adjacent end-arms (i.e., one from each of the two actuators (actuator-facing end-arms)) need to have one head-gimbal assembly (HGA) each to ensure an even split in capacity between the two actuators. Thus, the z-space required to fit two actuator arms (one actuator-facing end-arm each, from the upper and lower actuators) between the disks and have them adequately separated from each other is increased. This configuration, while being inefficient from the standpoint of achieving the highest possible capacity, also comes with a penalty to actuator inertia since an extra end-arm per actuator which carries just one HGA instead of two is an inefficient use of inertia/TB (terabyte). Further, there is an increase in TMR (track mis-registration) with having end-arms from two different actuators in the shared space between co-rotating disks. This necessitates the use of an odd number of disks, with the center disk of the stack being shared by the upper and lower actuators. In such a configuration, the actuator-facing end-arms of the upper and lower actuators that are serving the shared center disk have two HGAs each, while the cover/base facing end-arms have just one HGA each. Further, the arm-tip of the end-arm carrying two HGAs is thicker than the arm-tips of the other inner arms in the same head-stack assembly (HSA) with two HGAs. This increase in end-arm tip thickness is dictated by the larger disk spacing needed to accommodate the flexible cable assembly (FCA) traces for the HGA on the shared disk while precluding the need for a unique HGA. This increase in the dual-HGA end-arm tip thickness also mandates the end-arm root thickness to be higher than the other inner arms.

Under the foregoing scenario, the geometry (thickness) of the end-arm servicing the shared disk is quite different from any of the inner arms. This leads to a dynamic asymmetry in the actuator since there are now HSAs with (a) identical inner arms with two HGAs each, (b) a unique end-arm with two HGAs, and (c) a cover/base facing end-arm with one HGA. As a result of this mismatch, the actuator dynamics (as characterized by the plant transfer function) varies between the end-arm with one HGA and all the other arms with two HGAs (also referred to as dual-HGA arms), resulting in high gains in differing frequency ranges. The end-arm with a single HGA exhibits unusually high gains (significantly higher than the other arms with two HGAs) at certain frequencies. These high gains seen in the plant transfer function are associated with arm torsion, arm sway, and higher order system modes that are detrimental to the performance of the actuator.

In the context of a dual-actuator system, the dynamics of the two actuators are strongly coupled. This means that exciting one (primary) actuator (i.e., by way of seeking) causes resonance modes on the other (secondary) actuator to be excited as well. Here too, the secondary actuator dynamics differ between the end-arm with one HGA and all the other arms with two HGAs, resulting in high gains in different frequency ranges that are associated with arm modes. This coupling of dynamics negatively affects the ability of the active read-write head on the secondary actuator to stay on-track, or to efficiently seek to a track, due to excessive TMR. The performance of the HDD is thus reduced, in that an inordinate amount of time is expended trying to position and maintain the head centered over a data track (e.g., via servoing). The corresponding read and write operations are effectively delayed, thus reducing overall I/O performance. Furthermore, in scenarios in which a multitude of such HDDs populate a customer enclosure, acoustic excitation caused by air pressure fluctuations from cooling fans as well as structurally transmitted external vibration can excite arm and system resonance modes. The high gain of the end-arm with a single HGA for instance, clearly stands out in the acoustic transfer functions. It is these high gain arm and system modes that are either excited directly by the primary actuator or are coupled to the secondary actuator, or are excited by external vibration or acoustic pressure, that the embodiments described herein seek to mitigate.

Dual-Actuator System with Structural Dynamics Optimization Features

Embodiments described herein relate to approaches to managing actuator structural dynamics in dual-actuator HDDs with an odd number of HGAs, where the number of HGAs between the two end-arms of each actuator is different. In particular, the embodiments pertain to reducing the gain differences in the arm modes (torsion, sway) and system modes (Butterfly-3, Butterfly-4) seen in the plant transfer functions between arms with two HGAs and an arm with a single HGA. This is achieved by introducing an intentional mismatch of structural stiffness between the end-arm with a single HGA and the dual-HGA arms, which ensures that the gains for the problematic modes of interest (arm sway, arm torsion, and higher order system modes) are better matched between all the HGAs, and at the same time are also significantly reduced. Note that the number of actuators that may be assembled onto a shared pivot shaft may vary from implementation to implementation, however, an exemplary dual-actuator arrangement is described throughout herein.

Figure 1:
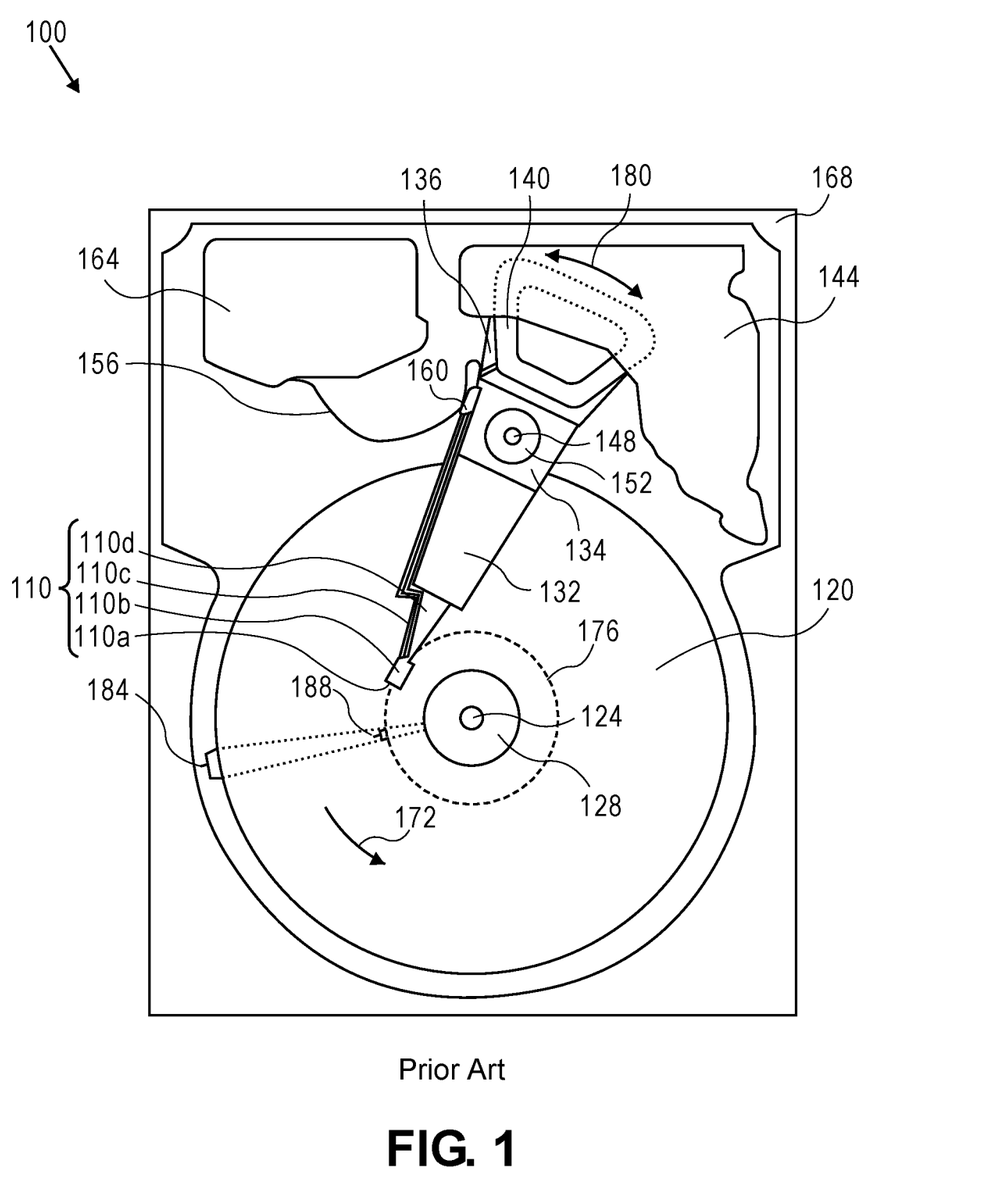
FIG. 1 is a plan view illustrating a hard disk drive (HDD), according to an embodiment.
Figure 2:
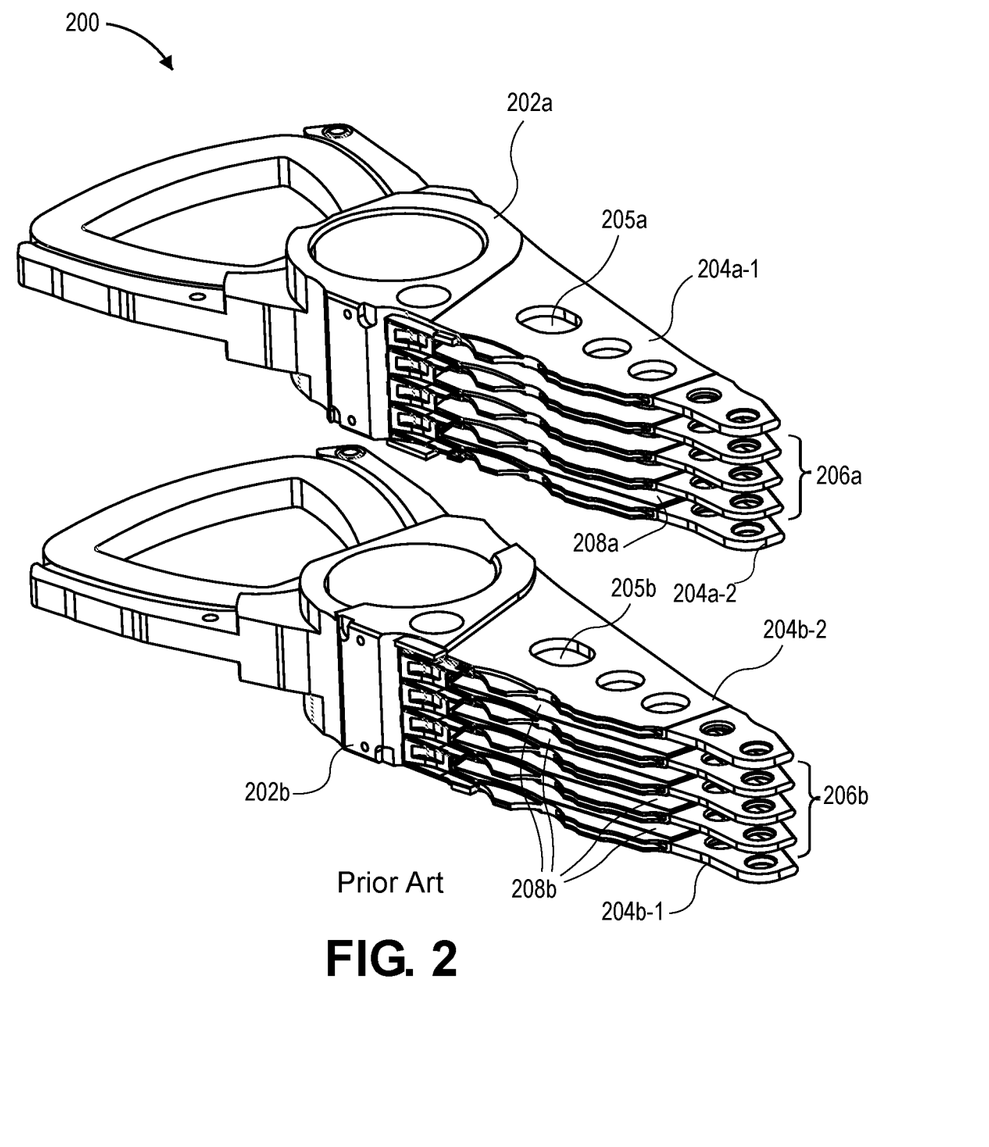
FIG. 2 is a perspective view illustrating a dual-actuator configuration, according to an embodiment.

FIG. 2 is a perspective view illustrating a dual-actuator configuration, according to an embodiment. FIG. 2 depicts a conventional configuration of a dual-actuator 200 with an unequal number of heads on the end-arms 204a-1, 204a-2 of the upper actuator 202a and, likewise, on the end-arms 204b-1, 204b-2 of the lower actuator 202b, without incorporating dynamics optimization features of the present embodiments. FIG. 2 specifically illustrates a configuration having two actuators 202a, 202b in an HDD comprising nine recording disks (not shown here; see, e.g., recording medium 120 of FIG. 1), where the upper and lower actuators 202a, 202b each comprises nine (9) heads. Each actuator 202a, 202b has (i) a single end-arm with a single HGA, i.e., end-arm 204a-1 and end-arm 204b-1, (ii) a single end-arm with two HGAs, i.e., end-arm 204a-2 and end-arm 204b-2, and (iii) one or more inner-arms with two HGAs, i.e., inner-arms 206a and inner-arms 206b. As discussed, the uppermost end-arm 204a-1 adjacent to an HDD cover would have a single HGA facing the upper or top surface of a corresponding disk, whereas the lowermost end-arm 204b-1 adjacent to an HDD base would have a single HGA facing the lower or bottom surface of a corresponding disk. Furthermore, the end-arms 204a-2, 204b-2 that are adjacent to each other and belong to separate actuators comprise two HGAs each, where one of the HGAs on end-arm 204a-2 and one of the HGAs on end-arm 204b-2 are configured to service a center shared disk of the disk stack. Generally, each arm 204a-1, 204a-2, 206a, 204b-1, 204b-2, 206b of each actuator 202a, 202b could have either a single arm damper 208a, 208b (applied to one surface of the arm) or could have two arm dampers 208a, 208b (applied to both surfaces of the arm). In the instance depicted in FIG. 2, the top actuator 202a has dampers (not visible here) applied on the underside of the inner-arms 206a and the bottom actuator 202b has dampers 208b applied on the upper surface of the inner-arms 206b, whereas the end-arm 204a-2 has a damper 208a applied to the upper surface of the arm and the end-arm 204b-2 has a damper (not visible here) applied to the underside of the arm. Each of the end-arms 204a-1, 204a-2, 204b-1, 204b-2 and the inner arms 206a, 206b may have an arm core hole 205a, 205b. Here, the core hole 205a, 205b geometries have the same configuration or shape on all of the arms.

Figure 3A:
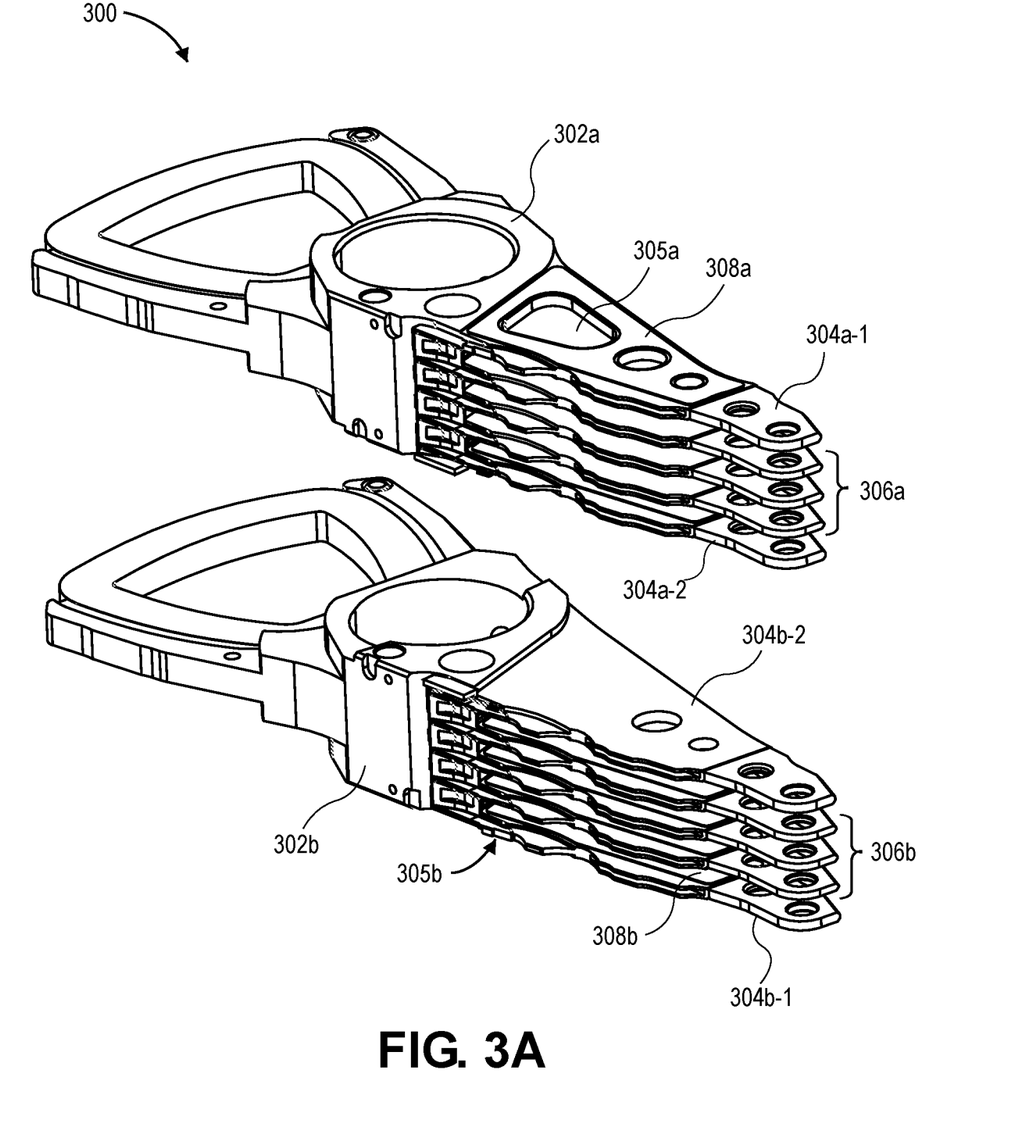
FIG. 3A is a perspective view illustrating a dual-actuator configuration having dynamics optimization features, according to an embodiment.

FIG. 3A is a perspective view illustrating a dual-actuator configuration having dynamics optimization features, according to embodiments. FIG. 3A depicts a generally similar dual-actuator configuration such as with FIG. 2, while incorporating elements of various embodiments described in more detail elsewhere herein. That is, FIG. 3A depicts an improved configuration of a dual-actuator 300 with an unequal number of heads on the end-arm 304a-1 (e.g., one head) and on the end- and inner-arms 304a-2, 306a (e.g., two heads per arm) of the upper actuator 302a. Likewise, there is an unequal number of heads on the end-arm 304b-1 (e.g., one head) and on the end- and inner-arms 304b-2, 306b (e.g., two heads per arm) of the lower actuator 302b. This is done, for example, in a configuration having two actuators 302a, 302b in an HDD comprising nine recording disks (not shown here; see, e.g., recording medium 120 of FIG. 1), where the upper and lower actuators 302a, 302b each comprises nine (9) heads. Each actuator 302a, 302b has a single end-arm with a single HGA, i.e., end-arm 304a-1 and end-arm 304b-1, whereas all other arms of that actuator carry two HGAs, i.e., end arms 304a-2, 304b-2 and inner-arms 306a, 306b. As discussed, the uppermost end-arm 304a-1 adjacent to an HDD cover would have a single HGA facing the upper or top surface of a corresponding disk, whereas the lowermost end-arm 304b-1 adjacent to an HDD base would have a single HGA facing the lower or bottom surface of a corresponding disk. The end-arms 304a-2, 304b-2 that are adjacent to each other and that belong to separate actuators comprise two HGAs each, where one of the HGAs on end-arm 304a-2 and one of the HGAs on end-arm 304b-2 are configured to service a center shared disk of the disk stack. According to embodiments, each arm 304a-1, 304a-2, 306a, 304b-1, 304b-2, 306b of each actuator 302a, 302b may have differing arm damper 308a, 308b configurations, as discussed in more detail elsewhere herein (see, e.g., FIGS. 3B-3C). Similarly, each of the end-arms 304a-1, 304a-2 carrying a single HGA and the other end-arms 304b-1, 304b-2 and the inner arms 306a, 306b carrying two HGAs may have differing arm core holes 305a, 305b configurations, according to embodiments, as discussed in more detail elsewhere herein. Here, the end-arms 304a-1, 304b-1 carrying a single HGA (one each for the top and bottom actuators 302a, 302b) have relevant distinguishing features.

Figure 4A:
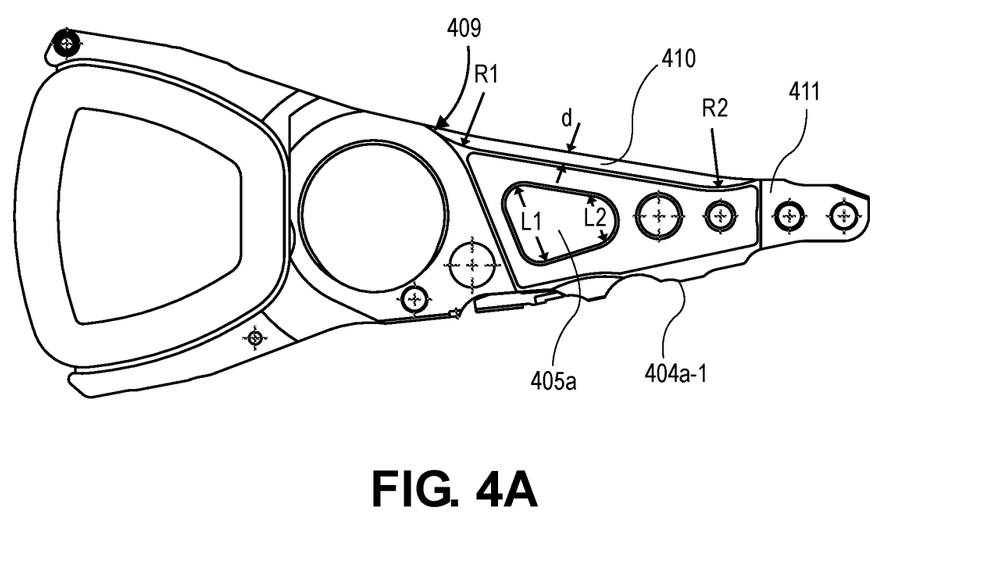
FIG. 4A is a top view illustrating a single-HGA end-arm of an HSA of a dual-actuator configuration, according to an embodiment.
Figure 4B:
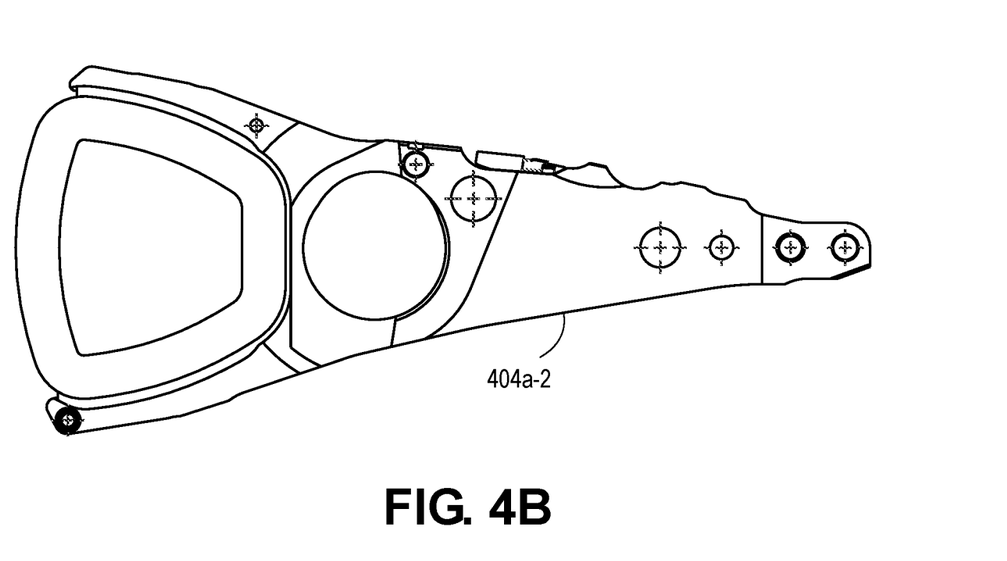
FIG. 4B is a bottom view illustrating the dual-HGA end-arm of the HSA of FIG. 4A, according to an embodiment.

FIG. 4A is a top view illustrating a single-HGA (head-gimbal assembly) end-arm of an HSA (head-stack assembly) of a dual-actuator configuration, and FIG. 4B is a bottom view illustrating the dual-HGA end-arm of the HSA of FIG. 4A, both according to embodiments. FIG. 4A depicts an embodiment of an end-arm 304a-1 (FIG. 3A-3C), referred to here as end-arm 404a-1. As such, end-arm 404a-1 is configured for implementation as an end-arm with a single HGA, in a dual-actuator configuration 300 (FIG. 3A) in which there are an unequal number of heads on the end-arms 304a-1, 304b-1 (FIG. 3A) and the other end- and inner-arms 304a-2, 306a, 304b-2, 306b (FIG. 3A) of each actuator 302a, 302b (FIG. 3A), such as in a configuration having two actuators 302a, 302b in an HDD comprising an odd number of recording disks and a central shared disk, where the upper and lower actuators 302a, 302b each comprises an odd number of heads. In one instance, the end-arm 404a-1 would be positioned adjacent to an HDD cover and would have a single HGA facing down onto the top surface of a corresponding top disk, and the end-arm 404a-2 of FIG. 4B corresponding to the same actuator (e.g., actuator 302a of FIG. 3A) would be positioned adjacent to the other actuator (e.g., actuator 302b of FIG. 3A) of a dual-actuator configuration 300 and would have two HGAs, one facing the bottom surface of an inner disk and one facing the top surface of a central shared disk. In another instance, the end-arm 404a-1 would be positioned adjacent to an HDD base and would have a single HGA facing up onto the bottom surface of a corresponding bottom disk, and the end-arm 404a-2 corresponding to the same actuator (e.g., actuator 302b) would be positioned adjacent to the other actuator (e.g., actuator 302a) of a dual-actuator configuration 300 and would have two HGAs, one facing the top surface of an inner disk and one facing the bottom surface of the central shared disk.

According to an embodiment, end-arm 404a-1 comprises a side notch 410, having a depth (d). According to a related embodiment, this side notch 410 is present only on each of the end-arms housing a single HGA (e.g., end-arms 304a-1, 304b-1), to manage the structural dynamics among the end-arms 304a-1, 304b-1 and all the other end- and inner-arms 304a-2, 304b-2, 306a, 306b. Here, the notch 410 is positioned on the inner side of the end-arm 404a-1, which would be on the side closest to a disk stack when implemented within an HDD. The notch 410 may be configured generally as depicted, i.e., with a first radius (R1) and a second radius (R2) to taper down from its maximum depth (d), for example, where R1 and R2 may be the same or may be different. According to an embodiment, the depth (d) of notch 410 is equal to or greater than 0.5 millimeters (mm) for example. However, this notch depth may vary from implementation to implementation, based on other design goals and constraints, and the like. Further, according to an embodiment, the notch 410 extends from a corresponding root 409 of the arm portion of the end-arm 404a-1 (or from +1 mm away from the root 409) to a corresponding swage pad 411 (or up to −1 mm from the swage pad 411). Likewise, the lead-in and lead-out radii (R1 and R2) may also vary from implementation to implementation based on other design goals and constraints, and the like.

According to an embodiment, end-arm 404a-1 comprises an arm core hole 405a at or near the root 409 (e.g., at the root-side) of the end-arm 404a-1, larger than the arm core hole 205a of the conventional dual-actuator 200 (FIG. 2), and having a triangular or quadrilateral shape. The core hole 405a may be configured generally as depicted, shown here having a substantially quadrilateral shape (here, with rounded corners, for simplicity of manufacturing purposes for example) with the side (with length L1) closest to the root 409 end larger than the side (with length L2) farthest from the root 409 (i.e., L1>L2), for structural dynamics purposes for example. According to a related embodiment, this core hole 405a is present only on each of the end-arms housing a single HGA (e.g., end-arms 304a-1, 304b-1), not on the other end- or inner-arms 304a-2, 304b-2, 306a, 306b, to manage the structural dynamics among all of the arms.

The embodiment employing the notch 410 and the embodiment employing the arm core hole 405a may each be implemented alone, or may preferably be implemented in combination, to manage and improve the structural dynamics of the dual-actuator system, such as to improve the arm torsion and sway mode dynamics and higher order system mode dynamics of each actuator 302a, 302b. Each of these features contributes to reducing and matching gains across all the HGAs for these undesirable modes. The gain reduction is achieved at least in part by introducing a mismatch of sway stiffness between the end-arms 304a-1, 304b-1 having one HGA and the other end- and inner-arms 304a-2, 306a, 304b-2, 306b having two HGAs, which is enabled by the foregoing described features. Additionally, employing end-arms 304a-2, 304b-2 and inner-arms 306a, 306b which carry two HGAs, having no arm core holes, further improves actuator system dynamics.

Figure 5A:
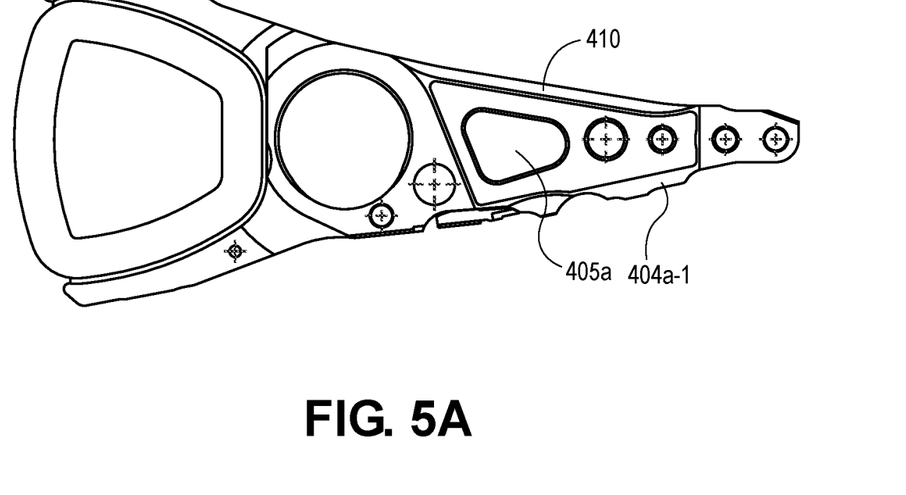
FIG. 5A is a top view illustrating a single-HGA end-arm of an HSA of a dual-actuator configuration, according to an embodiment.
Figure 5B:
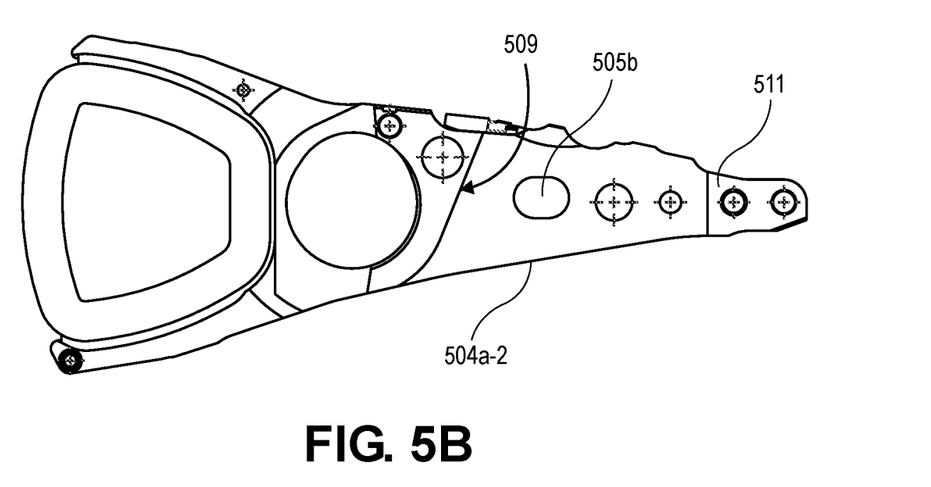
FIG. 5B is a bottom view illustrating the dual-HGA end-arm of the HSA of FIG. 5A, according to an embodiment.

FIG. 5A is a top view illustrating a single-HGA end-arm of an HSA of a dual-actuator configuration, and FIG. 5B is a bottom view illustrating the dual-HGA end-arm of the HSA of FIG. 5A, both according to embodiments. FIG. 5A depicts an embodiment of the end-arm 304a-1 (FIG. 3A-3C), which again is embodied in the end-arm 404a-1 of FIG. 4A. Here again, end-arm 404a-1 is configured for implementation as an end-arm with a single HGA, in a dual-actuator configuration 300 (FIG. 3A) in which there are an unequal number of heads on the end-arms 304a-1, 304b-1 (FIG. 3A) and the other end- and inner-arms 304a-2, 306a, 304b-2, 306b (FIG. 3A) of each actuator 302a, 302b (FIG. 3A), such as in a configuration having two actuators 302a, 302b in an HDD comprising an odd number of recording disks and a central shared disk, where the upper and lower actuators 302a, 302b each comprises an odd number of heads. Note that this end-arm 404a-1 is configured with the side notch 410 and the arm core hole 405a, just as described in reference to the similarly-labeled end-arm 404a-1 of FIG. 4A, to which reference is made for the detailed description of those respective features. According to a related embodiment, this side notch 410 is present only on each of the end-arms (e.g., end-arms 304a-1, 304b-1) housing a single HGA, to manage the structural dynamics among all of the arms.

The difference between the embodiments of FIGS. 5A-5B and the embodiments of FIGS. 4A-4B resides in the dual-HGA end-arm 504a-2 of the HSA, shown in FIG. 5B. Here, rather than having no arm core hole, such as with end-arm 404a-2 (FIG. 4B), end-arm 504a-2 comprises an arm core hole 505b between the root 509 of the end-arm 504a-2 (e.g., at the root-side of the end-arm 504a-2) and the corresponding swage pad 511. According to an embodiment, arm core hole 505b of end-arm 504a-2 is smaller in area than the arm core hole 405a of end-arm 404a-1, and is entirely contained within the footprint of the larger arm core hole 405a. Furthermore, according to an embodiment, the smaller arm core hole 505b is implemented in all of the arms that carry two HGAs, such as end-arms 304a-2, 304b-2 and inner-arms 306a, 306b of FIG. 3. This embodiment of an actuator such as actuator 302a of dual-actuator 300 can also contribute to reducing and matching gains across all the HGAs for the undesirable structural dynamics modes such as the actuator torsion and sway modes and the system modes.

Figure 3B:
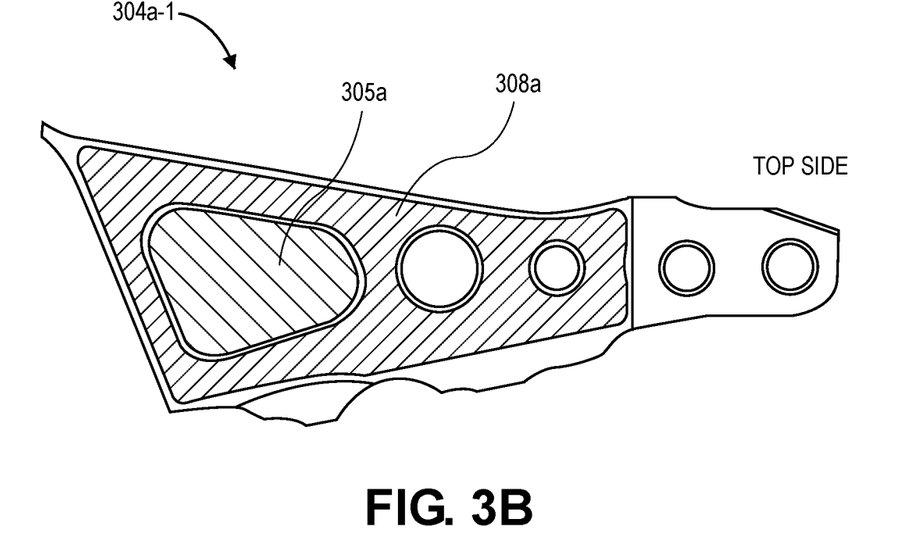
FIG. 3B is a top view illustrating a portion of the single-HGA (head-gimbal assembly) end-arm of the HSA (head-stack assembly) of FIG. 3A, according to an embodiment.
Figure 3C:
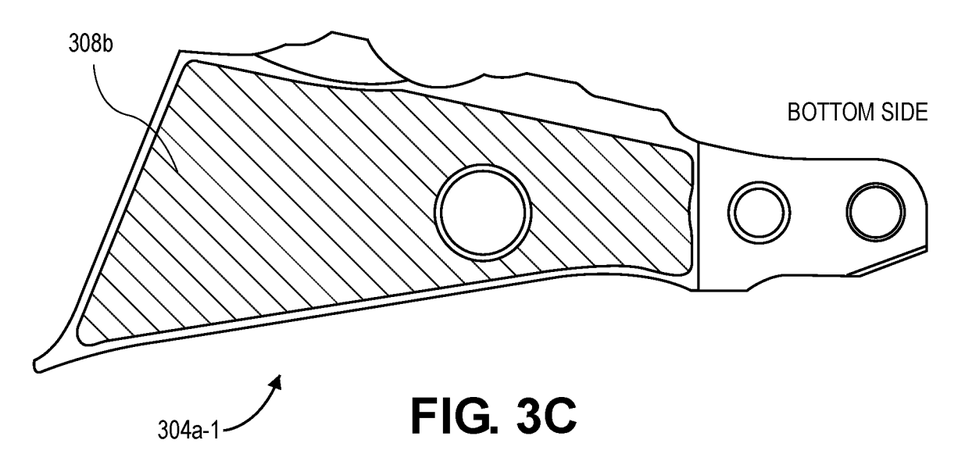
FIG. 3C is a bottom view illustrating a portion of the single-HGA end-arm of the HSA of FIG. 3A, according to an embodiment.

With reference now to FIGS. 3B-3C, FIG. 3B is a top view illustrating a portion of the single-HGA end-arm of the HSA of FIG. 3A, and FIG. 3C is a bottom view illustrating the single-HGA end-arm of the HSA of FIG. 3A, according to an embodiment. For example, FIG. 3B illustrates the top view and FIG. 3C illustrates the bottom view of an end-arm housing a single HSA such as end-arms 304a-1, 304b-1 (FIG. 3A), 404a-1 (FIG. 4A). Here, end-arm 304a-1 further comprises arm damper 308a coupled with the top, outer (non-disk side) surface of the base arm structure. Damper 308a comprises a through-hole (or cut-out) that is coincident with the through hole 305a of the end-arm 304a-1, such that the top of the through-hole 305a of the end-arm 304a-1 is not covered by the top damper 308a and thus the through-hole 305a is exposed, as depicted in FIG. 3B. According to an embodiment, the through-hole of the top damper 308a is shaped similarly to or preferably the same as the through-hole 305a of the end-arm 304a-1, such that the through-hole of the top damper 308a substantially overlays the through-hole 305a of the end-arm 304a-1.

According to a related embodiment, end-arm 304a-1 further comprises arm damper 308b coupled with the bottom, inner (disk side), or underside surface of the base arm structure. Unlike the top damper 308a, the bottom damper 308b does not comprise a through-hole coincident with the through hole 305a of the end-arm 304a-1 so that, here, the bottom or underside of the through-hole 305a of the end-arm 304a-1 is covered by the bottom damper 308b, as depicted in FIG. 3C. The dampers 308a, 308b coupled with the end-arm 304a-1 and/or 404a-1 contribute to reducing and matching gains across all the HGAs for the undesirable dynamics modes and, therefore, improve the actuator torsion and sway modes. According to an embodiment, the dampers 308a, 308b are composed of metal (e.g., stainless steel) with a viscoelastic adhesive (VEA).

Summarily, each of the foregoing embodiments characterizes an approach pertaining to reducing the gain differences in the arm modes (torsion, sway) and system modes (Butterfly-3, Butterfly-4) seen in the plant transfer functions between arms with two HGAs and an end-arm with a single HGA. This is achieved at least in part by introducing a structural stiffness mismatch between the arms with two HGAs and an end-arm with one HGA, such that the gains for the problematic modes of interest (e.g., arm sway, arm torsion, and higher order system modes) are better matched among all the HGAs, and at the same time are also beneficially reduced. Such approaches are equally applicable to scenarios in which the end-arm with two HGAs have different thicknesses for the arm root and the arm tip from the other inner arms.

In the context of a dual actuator HDD with an odd number of disks, these embodiments provide for improvements in the direct plant transfer function (i.e., the response of an actuator to its own actuation) and the coupled plant transfer functions (i.e., the response of the secondary actuator to actuation of the primary actuator). For example, embodiments can provide for a beneficial reduction of the gain of the end arm with a single HGA in the direct plant transfer function at critical frequencies associated with arm sway and higher order system modes. Furthermore, embodiments can provide for minimizing the differences in gain between the end-arm with one HGA and the end- and inner-arms with two HGAs at higher order system modes in the direct plant transfer function, achieved at least in part by way of an optimal mismatch of sway stiffness between end-arm with one HGA and other arms with two HGAs, which ensures that the responses of all the arms are balanced. This in turn enables a robust servo controller design. Embodiments can provide for a beneficial reduction in the gains of the arms with two HGAs in the direct plant transfer function at critical arm torsion frequencies. Still further, embodiments can provide for lower gains in the coupled plant transfer function at critical arm torsion and sway frequencies, and can provide for gain reduction in the acoustic transfer function (e.g., measured as off-track motion per unit sound pressure) at critical arm sway frequencies, leading to a lower cumulative acoustic gain (i.e. characterized by a lower cumulative Non-Repeatable Run-Out (NRRO)).

The described embodiments do not rely on the use of counter-weights of any form, which helps lower HDD cost by eliminating both part cost and process cost in internal assembly process, and improves performance by lowering inertia.

Figure 6A:
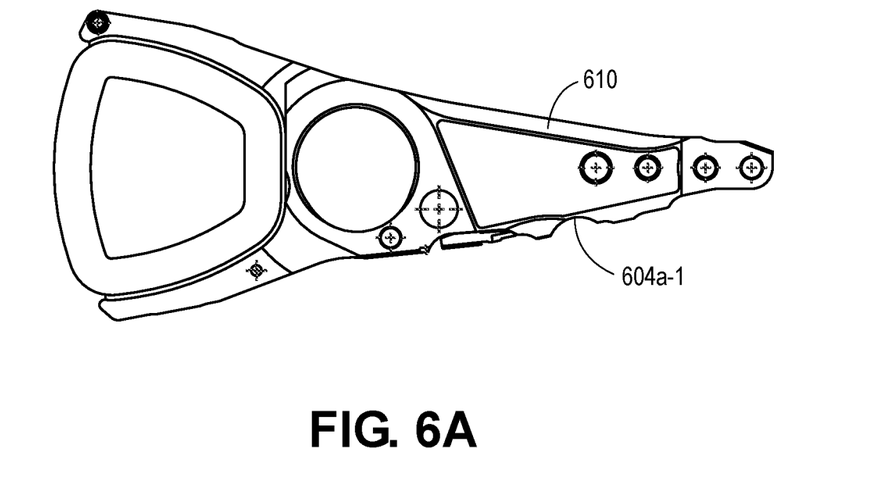
FIG. 6A is a top view illustrating a single-HGA end-arm of an HSA of a dual-actuator configuration, according to an embodiment.
Figure 6B:
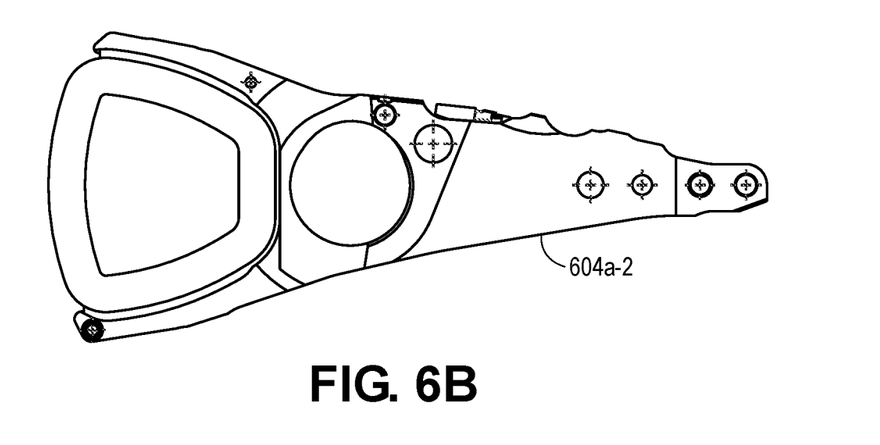
FIG. 6B is a bottom view illustrating the dual-HGA end-arm of the HSA of FIG. 6A, according to an embodiment.

Additional Approaches to Managing the Structural Dynamics Among Actuator Arms with an Unequal Number of Heads on the Two Outer Arms of Each Actuator FIG. 6A is a top view illustrating a single-HGA end-arm of an HSA of a dual-actuator configuration, and FIG. 6B is a bottom view illustrating the dual-HGA end-arm of the HSA of FIG. 6A, both according to an embodiment. FIG. 6A depicts an embodiment of the end-arm 304a-1 (FIG. 3A-3C), which is embodied in the end-arm 604a-1 of FIG. 6A. Here, end-arm 604a-1 is configured for implementation as an end-arm with a single HGA, in a dual-actuator configuration 300 (FIG. 3A) in which there are an unequal number of heads on the end-arms 304a-1, 304b-1 (FIG. 3A) and the other end- and inner-arms 304a-2, 306a, 304b-2, 306b (FIG. 3A) of each actuator 302a, 302b (FIG. 3A), such as in a configuration having two actuators 302a, 302b in an HDD comprising an odd number of recording disks and a central shared disk, where the upper and lower actuators 302a, 302b each comprises an odd number of heads. Note that this end-arm 604a-1 is configured with a side notch 610 configured, shaped, positioned the same as or similar to the side notch 410 (FIGS. 4A, 5A), but with no arm core hole such as the core hole 405a of FIGS. 4A, 5A. According to an embodiment, the depth of the side notch 610 of end-arm 604a-1 is greater than or equal to the depth of the side notch 410 (FIGS. 4A, 5A) of the end-arm 404a-1. Furthermore and according to an embodiment, the end-arm 604a-2 is similar to the end-arm 404a-2 (FIG. 4B) in that it would be positioned adjacent to the other actuator of a dual-actuator configuration 300 and would have two HGAs, and there is no arm core hole on end-arm 604a-2 such as there is with arm core hole 505b of FIG. 5B. Furthermore, in this embodiment this no core hole configuration applies to all of the arms that carry two HGAs, such as end-arms 304a-2, 304b-2 and inner-arms 306a, 306b of FIG. 3.

Figure 7A:
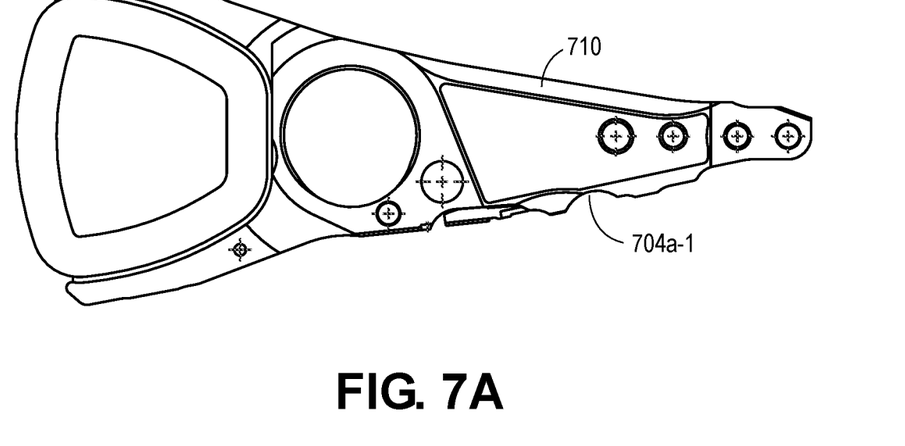
FIG. 7A is a top view illustrating a single-HGA end-arm of an HSA of a dual-actuator configuration, according to an embodiment.
Figure 7B:
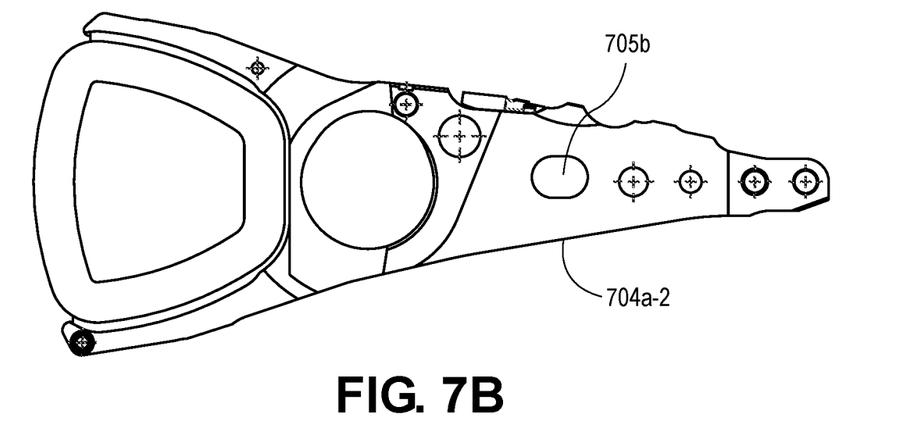
FIG. 7B is a bottom view illustrating the dual-HGA end-arm of the HSA of FIG. 7A, according to an embodiment.

FIG. 7A is a top view illustrating a single-HGA end-arm of an HSA of a dual-actuator configuration, and FIG. 7B is a bottom view illustrating the dual-HGA end-arm of the HSA of FIG. 7A, both according to an embodiment. FIG. 7A depicts an embodiment of the end-arm 304a-1 (FIG. 3A-3C), which is embodied in the end-arm 704a-1 of FIG. 7A. Here, end-arm 704a-1 is configured for implementation as an end-arm with a single HGA, in a dual-actuator configuration 300 (FIG. 3A) in which there are an unequal number of heads on the end-arms 304a-1, 304b-1 (FIG. 3A) and the other end- and inner-arms 304a-2, 306a, 304b-2, 306b (FIG. 3A) of each actuator 302a, 302b (FIG. 3A), such as in a configuration having two actuators 302a, 302b in an HDD comprising an odd number of recording disks and a central shared disk, where the upper and lower actuators 302a, 302b each comprises an odd number of heads. Note that this end-arm 704a-1 is configured with a side notch 710 configured, shaped, positioned the same as or similar to the side notch 410 (FIGS. 4A, 5A), but with no arm core hole such as the core hole 405a of FIGS. 4A, 5A. According to an embodiment, the depth of the side notch 710 of end-arm 704a-1 is greater than or equal to the depth of the side notch 410 (FIGS. 4A, 5A) of the end-arm 404a-1. Furthermore and according to an embodiment, the end-arm 704a-2 is similar to the end-arm 504a-2 (FIG. 5B) in that it would be positioned adjacent to the other actuator of a dual-actuator configuration 300 and would have two HGAs, and comprises an arm core hole 705b configured, shaped, positioned the same as or similar to the arm core hole 505b of FIG. 5B. Furthermore, in this embodiment this core hole configuration applies to all of the arms that carry two HGAs, such as end-arms 304a-2, 304b-2 and inner-arms 306a, 306b of FIG. 3.

Figure 8A:
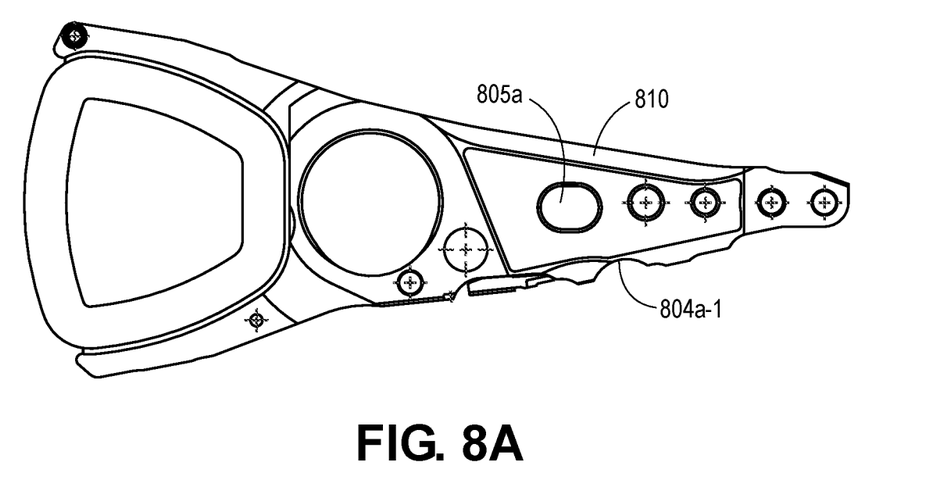
FIG. 8A is a top view illustrating a single-HGA end-arm of an HSA of a dual-actuator configuration, according to an embodiment.
Figure 8B:
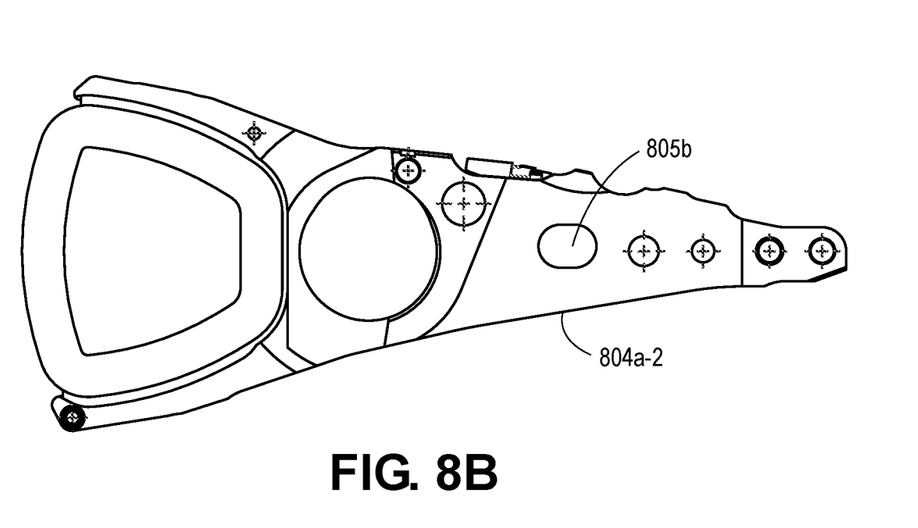
FIG. 8B is a bottom view illustrating the dual-HGA end-arm of the HSA of FIG. 8A, according to an embodiment.

FIG. 8A is a top view illustrating a single-HGA end-arm of an HSA of a dual-actuator configuration, and FIG. 8B is a bottom view illustrating the dual-HGA end-arm of the HSA of FIG. 8A, both according to an embodiment. Here, the end-arm 804a-2 is similar to the end-arms 504a-2 (FIG. 5B), 704a-2 (FIG. 7B) in that it would be positioned adjacent to the other actuator of a dual-actuator configuration 300 and would have two HGAs, and comprises an arm core hole 805*b* configured, shaped, positioned the same as or similar to the arm core holes 505*b*, 705*b* (FIGS. 5B, 7B). Furthermore, in this embodiment this core hole configuration applies to all of the arms that carry two HGAs (such as end arms 304*a*-2, 304*b*-2 and inner-arms 306*a*, 306*b* of FIG. 3), as well as the arms that carry a single HGA (such as end-arms 304*a*-1, 304*b*-1 of FIG. 3). As such, FIG. 8A depicts an embodiment of the end-arm 304*a*-1 (FIG. 3A-3C), which is embodied in the end-arm 804*a*-1 of FIG. 8A. Here, end-arm 804*a*-1 is configured for implementation as an end-arm with a single HGA, in a dual-actuator configuration 300 (FIG. 3A) in which there are an unequal number of heads on the end-arms 304*a*-1, 304*b*-1 (FIG. 3A) and the other end- and inner-arms 304*a*-2, 306*a*, 304*b*-2, 306*b* (FIG. 3A) of each actuator 302*a*, 302*b* (FIG. 3A), such as in a configuration having two actuators 302*a*, 302*b* in an HDD comprising an odd number of recording disks and a central shared disk, where the upper and lower actuators 302*a*, 302*b* each comprises an odd number of heads. Note that this end-arm 804*a*-1 is configured with a side notch 810 configured, shaped, positioned the same as or similar to the side notch 410 (FIGS. 4A, 5A), and with an arm core hole 805*a*. However, this core hole 805*a* differs in shape from and is smaller in area than the core hole 405*a* of FIGS. 4A, 5A. Note that this core hole 805*a* has the same geometry (e.g., same shape form and area) as the core hole 805*b*, i.e., all the arms have the same arm core hole geometry. According to an embodiment, the depth of the side notch 810 of end-arm 804*a*-1 is greater than or equal to the depth of the side notch 410 (FIGS. 4A, 5A) of the end-arm 404*a*-1.

The foregoing embodiments illustrated and described in reference to FIGS. 6A-8B can provide incremental benefits in relation to reducing and matching gains across all the HGAs for the undesirable structural dynamics modes and, therefore, provide some incremental improvements to various actuator torsion, sway, and system modes. Furthermore, in the context of all the embodiments illustrated and described in reference to FIGS. 3A-8B, the actuator z-datum may be defined to be on the surface surrounding the comb bore and closest to the end arm with a single HGA, which enables the machining of the larger arm core hole (if applicable) and the notch with a tighter tolerance on that end-arm, resulting in a robust design from a producibility standpoint.

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) head-stack assembly (HSA) comprising:
  a first end-arm to which a single head-gimbal assembly (HGA) is coupled, the first end-arm comprising:
    a notch along one side of the first end-arm;
  a second end-arm to which two HGAs are coupled; and
  a plurality of inner-arms positioned between the first and second end-arms and to each of which two HGAs are coupled;
  wherein none of the plurality of inner-arms and the second end-arm comprise a notch configured equivalently to the notch of the first end-arm.

2. The HSA of claim 1, wherein:
  the first end-arm further comprises a swage pad at an end opposing a root of the first end-arm; and
  the notch is a single notch spanning a portion of the one side of the first end-arm between the root and the swage pad.

3. The HSA of claim 1, wherein the first end-arm further comprises:
  a substantially triangular-shaped or substantially quadrilateral-shaped through-hole at a root-side of the first end-arm.

4. The HSA of claim 3, wherein the through-hole is substantially quadrilateral-shaped having a first width at a first side nearer the root greater than a second width at a second side farther from the root.

5. The HSA of claim 3, wherein none of the plurality of inner-arms and the second end-arm comprise a through-hole at a root-side of the inner-arm and a root-side of the second end-arm.

6. The HSA of claim 5, further comprising:
  a shared pivot shaft onto which the first and second end-arms are mounted in a hard disk drive.

7. The HSA of claim 3, further comprising:
  a top damper coupled to a top surface of the first end-arm and comprising a through-hole coincident with the through-hole of the first end-arm such that the through-hole of the first end-arm is not covered by the top damper.

8. The HSA of claim 7, further comprising:
a bottom damper coupled to a bottom surface of the first end-arm and comprising no through-hole coincident with the through-hole of the first end-arm such that the through-hole of the first end-arm is covered by the bottom damper.

9. The HSA of claim 8, further comprising:
a shared pivot shaft onto which the first and second end-arms are mounted in a hard disk drive.

10. The HSA of claim 7, wherein the through-hole of the top damper is shaped the same as the through-hole of the first end-arm.

11. The HSA of claim 3, wherein each of the plurality of inner-arms and the second end-arm comprises a through-hole at a root-side of the inner-arm and a root-side of the second end-arm, coincident with and smaller in area than the through-hole of the first end-arm.

12. The HSA of claim 1, wherein:
each of the plurality of inner-arms and the second end-arm comprises a through-hole at a root-side of the inner-arm and a root-side of the second end-arm; and
the first end-arm comprises no through-hole at a root-side of the first end-arm.

13. The HSA of claim 1, wherein:
the first end-arm further comprises a through-hole at a root-side of the first end-arm; and
each of the plurality of inner-arms and the second end-arm comprises a through-hole at a root-side of the inner-arm and a root-side of the second end-arm, coincident with and shaped the same as the through-hole of the first end-arm.

14. The HSA of claim 1, further comprising:
a shared pivot shaft onto which the first and second end-arms are mounted in a hard disk drive.

15. A data storage device comprising:
a plurality of disk media rotatably mounted on a spindle;
a first actuator assembly comprising:
a first head-stack assembly (HSA) comprising:
an end-arm to which a single head-gimbal assembly (HGA) is coupled, the end-arm comprising:
a substantially triangular-shaped or substantially quadrilateral-shaped through-hole at a root-side of the end-arm;
a plurality of dual-HGA arms to each of which two HGAs are coupled, wherein none of the plurality of dual-HGA arms comprise a through-hole at a root-side of dual-HGA arm; and
a first head slider comprising a read-write head configured to write to and to read from one of the plurality of disk media; and
a second actuator assembly comprising:
a second head-stack assembly (HSA) comprising:
an end-arm to which a single head-gimbal assembly (HGA) is coupled, the end-arm comprising:
a substantially triangular-shaped or substantially quadrilateral-shaped through-hole at a root-side of the end-arm;
a plurality of dual-HGA arms to each of which two HGAs are coupled, wherein none of the plurality of dual-HGA arms comprise a through-hole at a root-side of dual-HGA arm; and
a second head slider comprising a read-write head configured to write to and to read from another of the plurality of disk media.

16. The data storage device of claim 15, wherein:
the end-arm of the first HSA further comprises a notch along one side; and
the end-arm of the second HSA further comprises a notch along one side.

17. The data storage device of claim 16, wherein none of the plurality of dual-HGA arms comprise a notch configured equivalently to the notch of the end-arm of the first and second HSAs.

18. The data storage device of claim 15, further comprising:
a top damper coupled to a top non-disk-facing surface of each end-arm and comprising a through-hole coincident with the through-hole of the corresponding end-arm such that the through-hole of the end-arm is not covered by the top damper; and
a bottom damper coupled to a bottom disk-facing surface of each end-arm and comprising no through-hole coincident with the through-hole of the corresponding end-arm such that the through-hole of the end-arm is covered by the bottom damper.

19. The data storage device of claim 15, wherein the through-hole of each end-arm is substantially quadrilateral-shaped having a first width at a first side nearer the root greater than a second width at a second side farther from the root.

20. A multi-actuator hard disk drive including an odd number of recording media including a shared center disk shared by multiple actuators, the system comprising:
a first actuator assembly comprising:
a first head-stack assembly (HSA) comprising:
a first single-HGA end-arm to which a single head-gimbal assembly (HGA) is coupled;
a first dual-HGA end-arm to which two HGAs are coupled and which is configured to service the shared center disk;
a plurality of first inner-arms to each of which two HGAs are coupled; and
means for reducing gain differences in the arm structural dynamics modes between the first single-HGA end-arm, and the first dual-HGA end-arm and the first inner-arms; and
a second actuator assembly comprising:
a second head-stack assembly (HSA) comprising:
a second single-HGA end-arm to which a single head-gimbal assembly (HGA) is coupled;
a second dual-HGA end-arm to which two HGAs are coupled and which is configured to service the shared center disk;
a plurality of second inner-arms to each of which two HGAs are coupled; and
means for reducing gain differences in the arm structural dynamics modes between the second single-HGA end-arm, and the second dual-HGA end-arm and the second inner-arms.

21. A hard disk drive (HDD) head-stack assembly (HSA) comprising:
a first end-arm to which a single head-gimbal assembly (HGA) is coupled, the first end-arm comprising:
a swage pad at an end opposing a root of the first end-arm, and
a single notch along one side of the first end-arm and spanning a portion of the one side of the first end-arm between the root and the swage pad;
a second end-arm to which two HGAs are coupled; and a plurality of inner-arms positioned between the first and second end-arms and to each of which two HGAs are coupled.

22. A hard disk drive (HDD) head-stack assembly (HSA) comprising:
    a first end-arm to which a single head-gimbal assembly (HGA) is coupled, the first end-arm comprising:
        a notch along one side of the first end-arm, and
        a substantially triangular-shaped or substantially quadrilateral-shaped through-hole at a root-side of the first end-arm;
    a second end-arm to which two HGAs are coupled; and
    a plurality of inner-arms positioned between the first and second end-arms and to each of which two HGAs are coupled.

23. The HSA of claim 22, further comprising:
    a top damper coupled to a top surface of the first end-arm and comprising a through-hole coincident with the through-hole of the first end-arm such that the through-hole of the first end-arm is not covered by the top damper; and
    a bottom damper coupled to a bottom surface of the first end-arm and comprising no through-hole coincident with the through-hole of the first end-arm such that the through-hole of the first end-arm is covered by the bottom damper.

* * * * *